United States Patent
Araki

(10) Patent No.: US 10,635,264 B2
(45) Date of Patent: Apr. 28, 2020

(54) INFORMATION PROCESSING APPARATUS, INFORMATION PROCESSING SYSTEM, METHOD FOR PROCESSING INFORMATION, AND INFORMATION PROCESSING PROGRAM

(71) Applicant: Ryoji Araki, Fukuoka (JP)

(72) Inventor: Ryoji Araki, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 287 days.

(21) Appl. No.: 15/480,563

(22) Filed: Apr. 6, 2017

(65) Prior Publication Data
US 2017/0293457 A1    Oct. 12, 2017

(30) Foreign Application Priority Data
Apr. 11, 2016   (JP) .................................. 2016-078637

(51) Int. Cl.
 *G06F 3/0482*     (2013.01)
 *H04N 21/414*    (2011.01)
 (Continued)

(52) U.S. Cl.
 CPC .......... *G06F 3/0482* (2013.01); *G06F 3/0481* (2013.01); *G06F 8/38* (2013.01);
 (Continued)

(58) Field of Classification Search
 CPC ....... H04N 21/41407; G06F 8/38; G06F 8/61; G06F 9/451; G06F 3/0412; G06F 3/0481; G06F 3/0482; G06F 3/04842
 (Continued)

(56) References Cited

U.S. PATENT DOCUMENTS 9,307,108 B2   4/2016  Araki
9,323,478 B2   4/2016  Araki
(Continued)

FOREIGN PATENT DOCUMENTS

JP   2014-041168   3/2014
JP   2016-010024   1/2016
(Continued)

OTHER PUBLICATIONS

Nobuyuki Yashima, Minoru Fujita, "Get Pleasant Operability! Launcher Catalogue", Palm Magazine Jul. 23, 2003 (Jul. 23, 2003), pp. 48-53, vol. 18, ASCII, Japan, with English partial translation.
(Continued)

*Primary Examiner* — Jason M Mandeville
(74) *Attorney, Agent, or Firm* — IPUSA, PLLC

(57) ABSTRACT

An information processing apparatus including a first control unit laying out displaying a first operation screen for selecting a use target program from among at least one program upon an operation of a first display element, and a second control unit selecting an operation screen related to a first program related to the at least one second display element upon an operation of a second display element, wherein the first control unit selects, in a case where a specific program is installed or started up and the first display element is operated, an operation screen related to the specific program instead of the first operation screen, wherein the second control unit selects, in a case where the specific program is installed or started up and the second display element corresponding to the first program before the specific program is installed or started up is operated, another operation screen.

15 Claims, 11 Drawing Sheets

(51) Int. Cl.
*G06F 9/451* (2018.01)
*G06F 8/38* (2018.01)
*G06F 3/0481* (2013.01)
*G06F 3/041* (2006.01)
*G06F 3/0484* (2013.01)
*G06F 8/61* (2018.01)

(52) U.S. Cl.
CPC ....... *G06F 9/451* (2018.02); *H04N 21/41407* (2013.01); *G06F 3/0412* (2013.01); *G06F 3/04842* (2013.01); *G06F 8/61* (2013.01)

(58) Field of Classification Search
USPC .......................................... 345/173; 715/700
See application file for complete search history.

(56) References Cited

U.S. PATENT DOCUMENTS

| | | | | |
|---|---|---|---|---|
| 2011/0060988 A1* | 3/2011 | Mysliwy | ............. | G06F 3/04817 715/702 |
| 2011/0164269 A1* | 7/2011 | Kamishiro | ............. | G06F 21/31 358/1.13 |
| 2011/0292428 A1* | 12/2011 | Ishii | ............. | G06F 3/0482 358/1.13 |
| 2012/0110496 A1* | 5/2012 | Lee | ............. | G06F 3/0488 715/778 |
| 2012/0284654 A1* | 11/2012 | Kwon | ............. | G06F 3/04892 715/764 |
| 2016/0011773 A1* | 1/2016 | Huang | ............. | G06F 3/04886 715/773 |
| 2016/0014113 A1 | 1/2016 | Akiyoshi et al. | | |
| 2016/0044200 A1 | 2/2016 | Araki et al. | | |
| 2016/0065756 A1 | 3/2016 | Araki et al. | | |
| 2016/0203033 A1 | 7/2016 | Araki | | |
| 2016/0205277 A1 | 7/2016 | Araki | | |
| 2016/0274741 A1* | 9/2016 | Kawai | ............. | H04N 1/00307 |
| 2016/0275282 A1 | 9/2016 | Araki | | |
| 2017/0094121 A1* | 3/2017 | Mizuno | ............. | G06F 21/45 |
| 2017/0123625 A1* | 5/2017 | Gao | ............. | H04M 1/72522 |
| 2017/0139658 A1* | 5/2017 | Nagata | ............. | B41J 29/38 |
| 2017/0161048 A1 | 6/2017 | Araki | | |

FOREIGN PATENT DOCUMENTS

| | | |
|---|---|---|
| WO | 2013/133007 | 9/2013 |
| WO | 2015/190289 | 12/2015 |
| WO | 2015/198972 | 12/2015 |

OTHER PUBLICATIONS

Yuki Anzai, "Android UI Cookbook for 4.0 ICS (Ice Cream Sandwich) application Development", Mar. 21, 2012, pp. 2-9, Chapter1, Impress, Inc., Japan, with English partial translation.
Japanese Office Action for 2016-078637 dated Jan. 14, 2020.

* cited by examiner

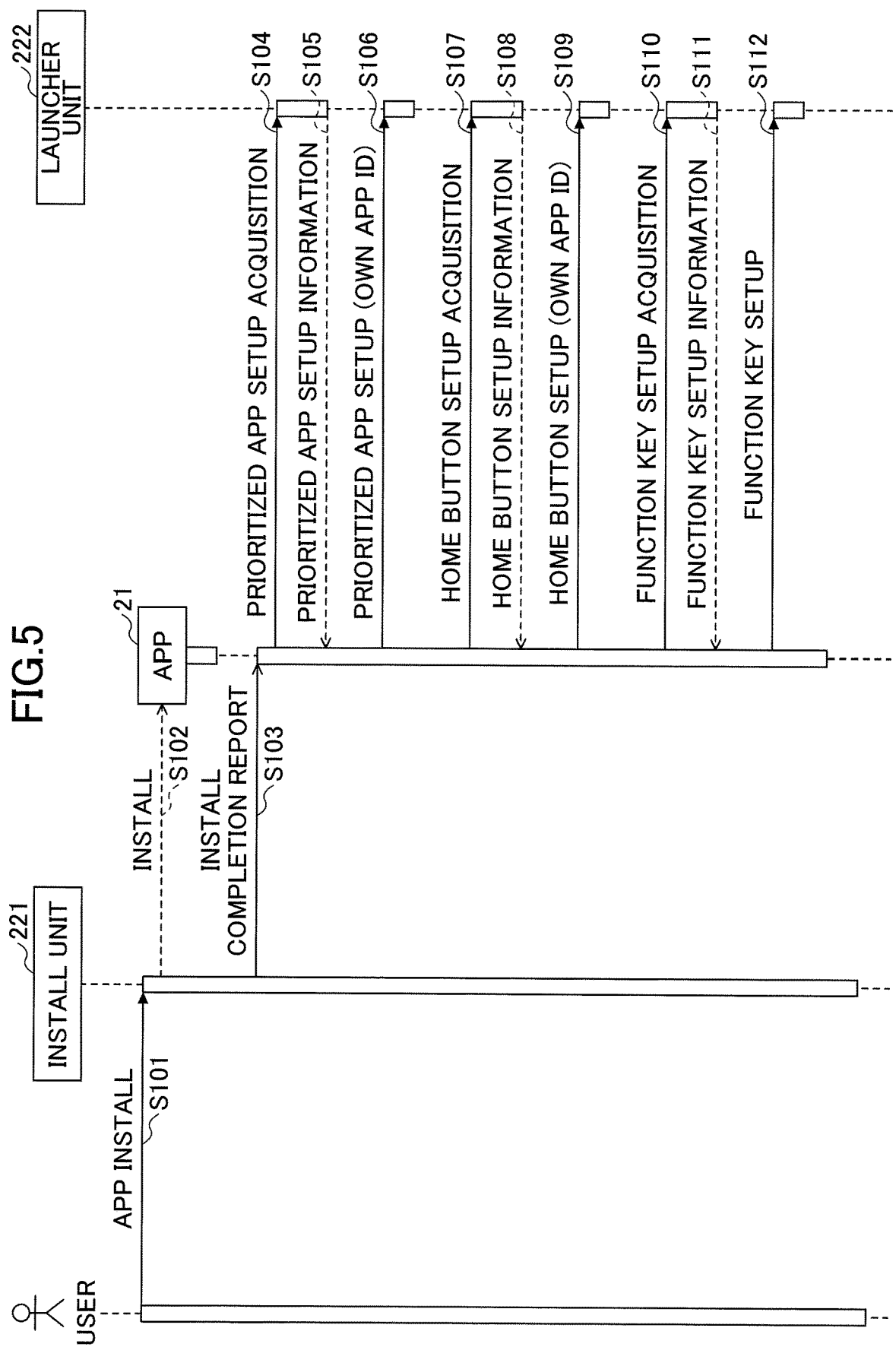

INFORMATION PROCESSING APPARATUS, INFORMATION PROCESSING SYSTEM, METHOD FOR PROCESSING INFORMATION, AND INFORMATION PROCESSING PROGRAM

CROSS-REFERENCE TO RELATED APPLICATIONS

The present application claims priority under 35 U.S.C. § 119 to Japanese Patent Application No. 2016-078637, filed Apr. 11, 2016. The contents of which are incorporated herein by reference in their entirety.

BACKGROUND OF THE INVENTION

Field of the Invention

The present invention relates to an information processing apparatus, an information processing system, a method for processing information, and an information processing program.

Description of the Related Art

Various apparatuses represented by an image forming apparatus includes an apparatus onto which an application program (hereinafter, referred to as an "app") can be installed. Various apps installed in the various applications includes an app (hereinafter, referred to as a "solution app") which can specialize the usage of the apparatus to a specific solution. Specifically, when the solution app is installed onto the apparatus, an operation screen for the solution is displayed instead of an ordinary initial screen. As a result, a function usable by a user from among functions performed by the apparatuses relates to the solution.

However, there is an apparatus having an operation panel, on which a home button or a function key are arranged, among the various apparatuses. The home button receives a transition instruction of instructing to transit to the initial screen. The function key is a key (a button) for receiving the transition to an operation screen to the specific app. In the case where the apparatus has this home button or this function key, even though the solution app is installed and the operation screen for the solution is displayed after starting up the apparatus, if the home button or the function key is pushed down, there is a possibility that the app unrelated to the solution becomes usable. Then, a probability that the apparatus is used in a mode different from a use mode admitted by an administrator increases. In this case, the administration of the apparatus may become difficult.

SUMMARY OF THE INVENTION

The present invention is provided in consideration of the above points. An object of the present invention is to enable a limitation to a program usable related to a specific program.

An information processing apparatus includes a first control unit configured to lay out a first display element on a display area where operation screens are displayed and display a first operation screen for selecting a use target program from among at least one program upon an operation of the first display element, and a second control unit configured to lay out at least one second display element on the display area and select an operation screen related to a first program related to the at least one second display element upon an operation of any one of the at least one second display element, wherein the first control unit selects, in a case where a specific program is installed or started up and the first display element is operated, an operation screen related to the specific program instead of the first operation screen, wherein the second control unit selects, in a case where the specific program is installed or started up and the second display element corresponding to the first program before the specific program is installed or started up is operated, an operation screen related to a program different from the first program as a transition destination.

BRIEF DESCRIPTION OF THE DRAWINGS

FIG. 5 is a sequence diagram illustrating an exemplary procedure performed at a time of installing a specific application in the first embodiment.

DESCRIPTION OF THE EMBODIMENTS

Figure 1:
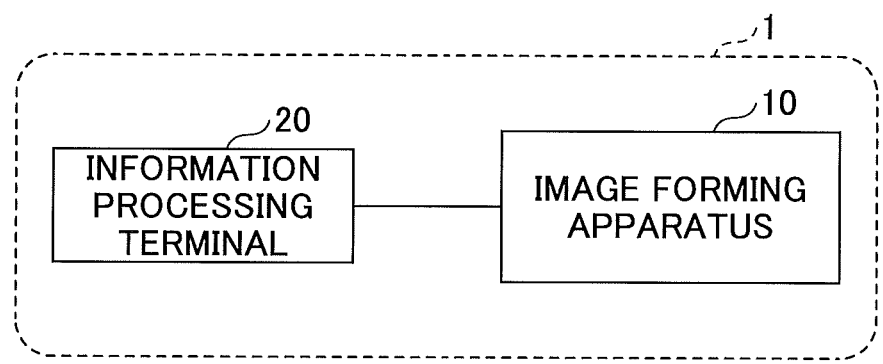
FIG. 1 illustrates an exemplary structure of an information processing system of a first embodiment.

Hereinafter, an embodiment of the present invention is described based on figures. FIG. 1 illustrates an exemplary structure of an information processing system of a first embodiment of the present invention. In an information processing system 1 illustrated in FIG. 1, an image forming apparatus 10 is connected to an information processing terminal 20 so as to be communicable each other. The communication between the image forming apparatus 10 and the information processing terminal 20 are performed through a universal serial bus (USB), a near field wireless communication, a network such as a local area network (LAN) (regardless of wired and wireless), or the like.

The image forming apparatus 10 is a multifunction peripheral which can substantialize at least two of functions of printing, scanning, copying, and sending and receiving FAX with one casing. However, the apparatus having any one function among printing, scanning, copying, and sending and receiving FAX may be used as the image forming apparatus 10. The image forming apparatus 10 is an example of the apparatus. The apparatus such as a projector, a teleconference system, and a digital camera may be used in place of the image forming apparatus 10.

The information processing terminal 20 is an electronic apparatus, which can individually complete information processing, such as a smartphone and a tablet-type terminal. Within the first embodiment, the information processing terminal 20 functions as an operation unit of the image forming apparatus 10. Specifically, the information processing terminal 20 is connected to the image forming apparatus 10 instead of a conventional operation unit installed exclusively for the image forming apparatus 10.

The information processing terminal 20 is installed in the image forming apparatus 10 so as to be fixed at a predetermined position (for example, a position where the operation panel is disposed) of the image forming apparatus 10. Therefore, the information processing terminal 20 and the image forming apparatus 10 may be understood to be a single device. Alternatively, the information processing terminal 20 may be removable (separable) from the image forming apparatus 10. In a state where the information processing terminal 20 is removed, the information processing terminal 20 may function as the operation unit of the image forming apparatus 10 through wireless communications using Bluetooth ("Bluetooth" is a registered trademark), an infrared ray, or the like.

Figure 2:
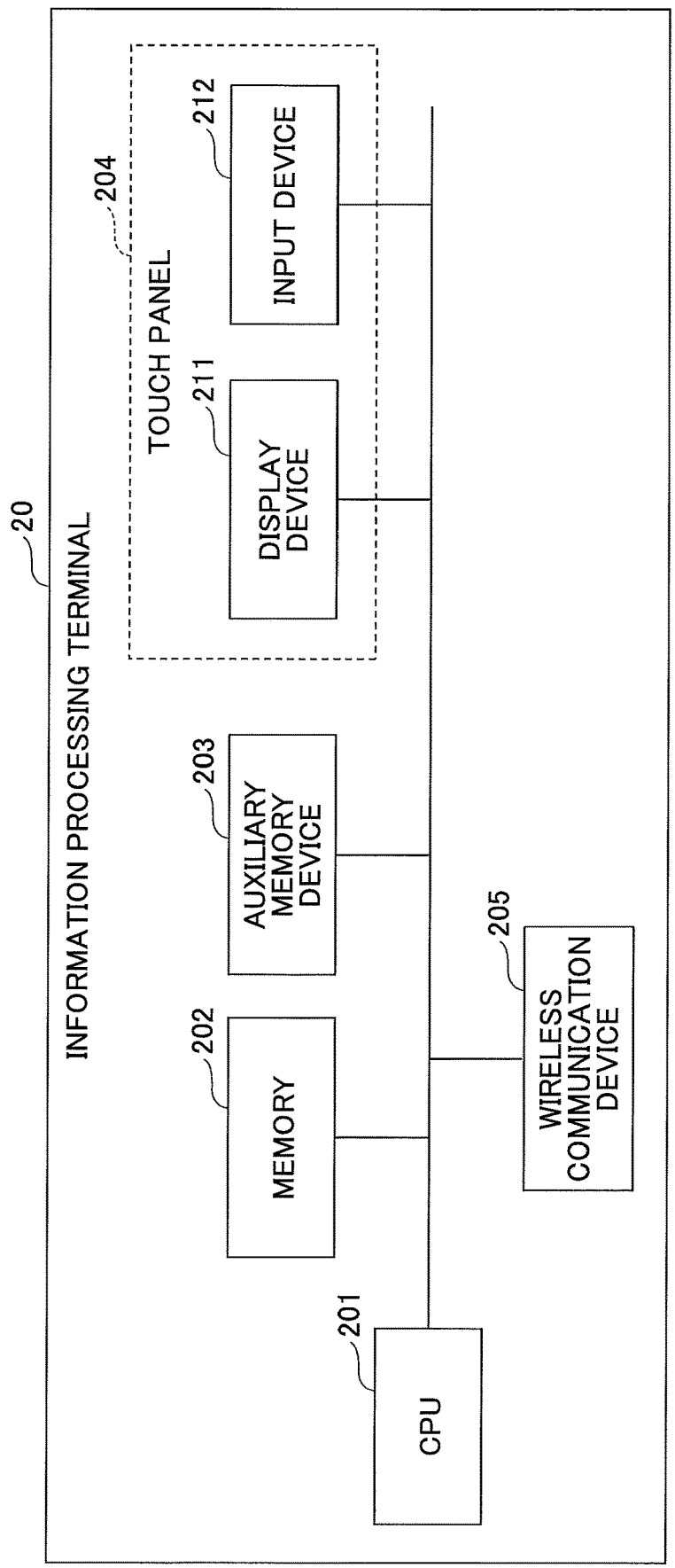
FIG. 2 illustrates an exemplary hardware structure of an information processing terminal of the first embodiment.

FIG. 2 illustrates an exemplary hardware structure of the information processing apparatus of the first embodiment. Referring to FIG. 2, the information processing terminal 20 includes a CPU 201, a memory 202, an auxiliary memory device 203, a touch panel 204, and a wireless communication device 205.

The auxiliary memory device 203 stores a program or the like installed in the information processing terminal 20. The memory 202 reads out the program from the auxiliary memory device 203 when the program is instructed to be invoked and stores the program in the memory 202. The CPU 201 substantializes a function related to the information processing terminal 20 in conformity with the program stored in the memory 202.

The touch panel 204 is an electronic component having both an input function and a display function to display information or receive an input from the user. The touch panel 204 includes a display device 211, an input device 212, and so on.

The display device 211 is a liquid crystal display or the like and performs a display function of the touch panel 204. The input device 212 is an electronic component including a sensor for detecting a touch of a touching object on the display device 211. A detection method of the touching object may be any one of known methods such as an electrostatic method, a resistance film method, and an optical method. The touching object is an object touching a contact surface (a front surface) of the touch panel 204. As an example of the touching object is a finger of the user, a dedicated pen, an ordinary pen, or the like.

The wireless communication device 205 is an electronic component such as an antenna for communications in a wireless local area network (LAN) or a mobile communication network.

Figure 3:
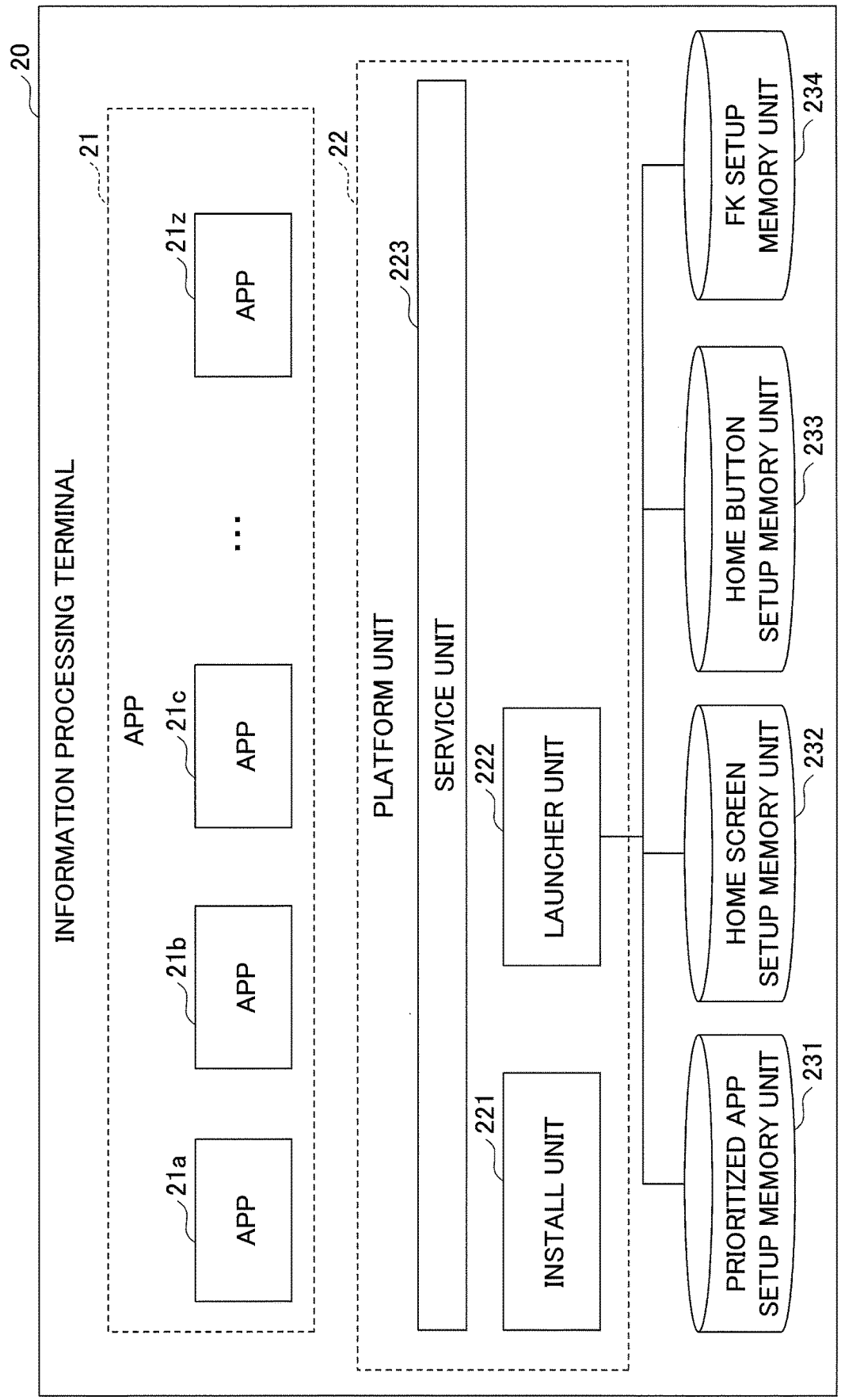
FIG. 3 illustrates an exemplary functional structure of the information processing terminal of the first embodiment.

FIG. 3 illustrates an exemplary functional structure of the information processing terminal of the first embodiment. Referring to FIG. 3, the information processing terminal 20 includes at least one application (app) 21, a platform unit 22, and so on. The at least one app 21, the platform unit 22, and so on are substantialized when one or more programs installed in the information processing terminal 20 are executed by the CPU 201. The information processing terminal 20 uses a prioritized app setup memory unit 231, a home screen setup memory unit 232, a home button setup memory unit 233, a FK setup memory unit 234, and so on. These prioritized app setup memory unit 231, the home screen setup memory unit 232, the home button setup memory unit 233, the FK setup memory unit 234, and so on may be implemented by a memory device communicable with the information processing terminal 20.

The app 21 is an application program using the function of the image forming apparatus 10 to provide a predetermined service to the user. Said differently, the user uses the app 21 to function the image forming apparatus 10. Referring to FIG. 3, a kind of the app 21 is exemplified as an app 21a, an app 21b, an app 21c, and an app 21z.

The platform unit 22 is a program group providing a function that is a platform for various apps 21. Referring to FIG. 3, the platform unit 22 includes an install unit 221, a launcher unit 222, and a service unit 223.

The install unit 221 controls an install process of installing the app 21. The install unit 221 reports the completion of the install to the app 21 being the install target after the install finishes.

The launcher unit 222 displays a home screen on a display device 211. The home screen is an operation screen for selecting the app 21 as the use target from among various apps 21 installed on the information processing terminal 20. For example, icons of various apps 21 are laid out on the home screen. The layout information of the icons on the home screen is stored in a home screen setup memory unit 232.

Within the first embodiment, the home screen is an operation screen that is basically displayed firstly after canceling a use limitation in using the information processing system 1 (in a predetermined state). The situation where the usage limitation is canceled may be when the information processing terminal 20 and the image forming apparatus 10 are completely started up to enable the information processing system 1 to be used. However, in a case where a screen (ex, a login screen) for a user authentication is displayed after the information processing terminal 20 and the image forming apparatus 10 are completely started up, the user is authenticated through this screen. Here, a situation transited to a waiting state where an input from the user is being waited is a situation where the usage limitation is canceled.

The launcher unit 222 performs a determination of the app 21 (hereinafter, referred to as a "prioritized app" by which the operation screen is firstly displayed after starting up the information processing system 1, display of the home button and the function key on a display area of each operation screen, a process control in response to an operation (a pushdown) of the home button or a function key, and so on.

The determination of the prioritized app is conducted by referring to the prioritized app setup memory unit 231. Said differently, the prioritized app setup memory unit 231 stores identification information (hereinafter, referred to as an "app ID") of the app 21 corresponding to the prioritized app. In a case where the prioritized app is set, the operation screen firstly displayed after the usage limitation of the information processing system 1 is canceled is an operation screen related to the prioritized app.

The home button is a button of software (a display element) displayed at a predetermined position of the display area together with each operation screen so as to receive a transition instruction to transit to the home screen. However, it is possible to allocate an operation screen other than the home screen to the home button. For example, it is possible to allocate the operation screen related to the specific app 21 to the home button. In this case, the app ID of the app 21 allocated to the home button is stored in the home button setup memory unit 233.

The function key is a software key (a display element) displayed at a predetermined position of the display area together with each operation screen so as to receive a transition instruction to transit to the operation screen related to the specific app 21. At least one function key can be laid out. One app 21 can be allocated to each function key. Corresponding information between the function keys and the apps 21 is stored in the FK setup memory unit 234.

Figure 4A:
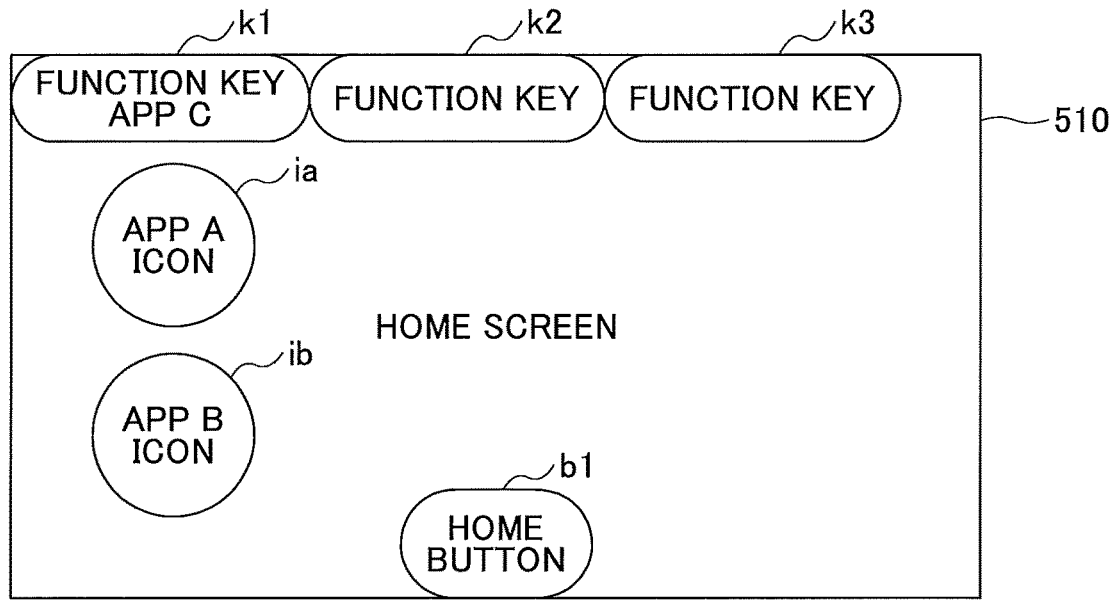
FIG. 4A illustrates an exemplary display of a home button and a function key.
Figure 4B:
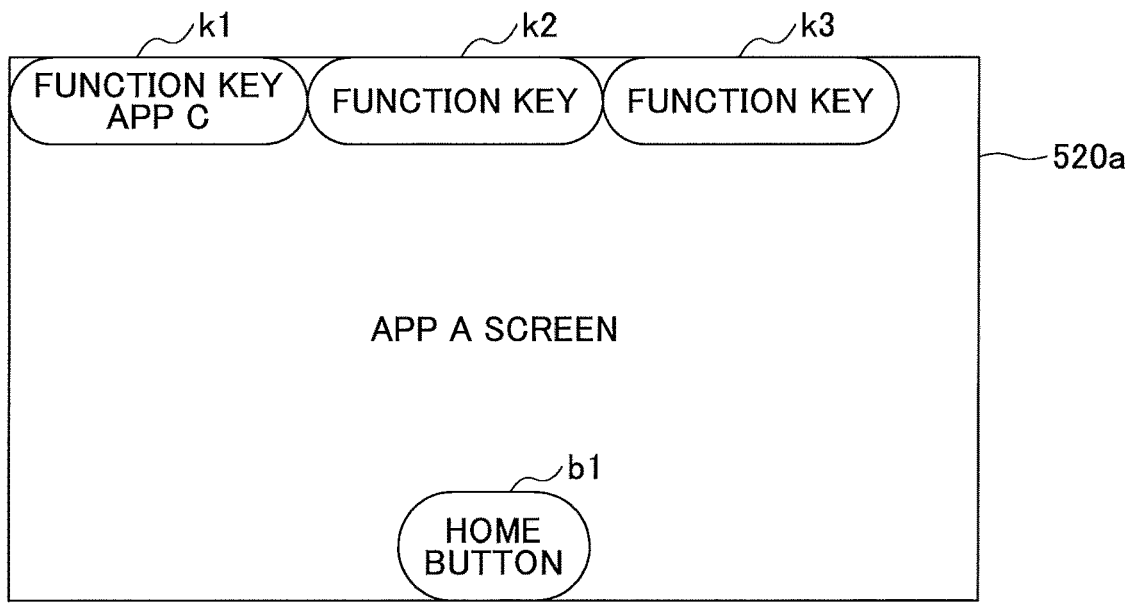
FIG. 4B illustrates another exemplary display of the home button and the function key.

FIGS. 4A and 4B illustrate exemplary displays of the home button and the function key. Referring to FIG. 4A, a home button b1 and function keys k1 to k3 are displayed together with a home screen 510. Referring to FIG. 4A, an icon is indicative of the app 21a and an icon ib indicative of the app 21b are laid out on the home screen 510.

Referring to FIG. 4B, a home button b1 and function keys k1 to k3 are displayed together with an operation screen 520a (an app A screen) related to the app 21a. Basically, the home button b1 and the function keys k1 to k3 are always displayed. For example, referring to FIG. 4B, when the user pushes down the function key k1, the app 21c can be started to use without going through the home screen 510. Hereinafter, when the function keys k1 to k3 are not distinguished, the function keys k1 to k3 are called a "function key k".

The service unit 223 wraps various interfaces (Application Program Interface (API)) of composing elements of the platform unit such as the install unit 221 and the launcher unit 222, and provides the wrapped interface to the app 21.

Hereinafter, the procedure performed by the information processing terminal 20 is described. FIG. 5 is a sequence diagram illustrating an exemplary procedure at a time of installing the specific application 21 in the first embodiment. Referring to FIG. 5, the app 21 being the install target is referred to as a "target app 21".

When the user inputs an install instruction to install the target app 21 through the input device 212 (step S101), the install unit 221 installs the target app 21 on the information processing terminal (step S102). Icon information of the target app 21 may be stored in the home screen setup memory unit 232 as a display target of the home screen 510 in response to the install of the target app 21. The icon information includes image data indicative of the icon and the app ID corresponding to the icon. The information stored in the home screen setup memory unit 232 can be appropriately edited. For example, by deleting the icon information of the certain app 14, the icon of this app 21 can be made non-display.

Subsequently, the install unit 221 reports the completion of the install to the target app 21 (step S103). On or after step S104 executed in response to the report, the processes depend on the target app 21. For example, the necessity of executing steps on and after step S104 and an execution content may be determined in response to a setup content of setup information that is included in an install package of the target app 21. The steps on and after step S104 may not be executed for most of apps 21, and the steps on and after step S104 may be executed only for a specific app 21.

In step S104, the target app 21 requests the launcher unit 222 to acquire a setup of a prioritized app. In response to this request, the launcher unit 222 acquires a memory content of the prioritized app setup memory unit 231 and responds to the target app 21 to report the memory content to the target app 21 (step S105). For example, if any one of the apps 21 has already been set as the prioritized app, the app ID of this app 21 is reported. If there is not the app 21 set as the prioritized app, information indicating that the prioritized app is not set is reported.

Subsequently, the target app 21 designates the own app ID and requests the launcher unit 222 to set the prioritized app (step S106). The launcher unit 222 stores the app ID into the prioritized app setup memory unit 231. Said differently, the target app 21 is set as the prioritized app. In a case where the prioritized app has been already set, step S106 may be unexecuted.

Subsequently, the target app 21 requests the launcher unit 222 to acquire the setup of the home button b1 (step S107). The launcher unit 222 acquires the memory content of the home button setup memory unit 233 and responds to the target app 21 to report the memory content to the target app 21 (step S108). For example, if the transition destination at a time of pushing down the home button b1 is the home screen 510 (said differently, the transition destination is as planned), the home button setup memory unit 233 stores information indicative of the home screen 510. On the other hand, if the transition destination at the time of pushing down the home button b1 is the operation screen of any one of the apps 21, the app ID of the app 21 is stored in the home button setup memory unit 233.

Subsequently, the target app 21 designates the own app ID and requests the launcher unit 222 to set the home button b1 (step S109). The launcher unit 222 stores the app ID into the home button setup memory unit 233. Said differently, the target app 21 is allocated to the home button b1. If the transition destination of the home button b1 is set to another app 21, step S109 may be set so as to be prevented from being executed.

Subsequently, the target app 21 requests the launcher unit 222 to acquire the setup of the function key k1 (step S110). The launcher unit 222 acquires the memory content of the FK setup memory unit 234 and responds to the target app 21 to report the memory content to the target app 21 (step S111). For example, regarding the function key k, to which the app 21 receiving information associating, for each function key k, the identification information (hereinafter, referred to as "key ID") of the function key k with the app ID of the app 21 allocated to the function key k is not allocated, only the key ID is reported.

Subsequently, the target app 21 designates allocation information of the app 21 to each function key k and requests the launcher unit 222 to conduct the allocation of the app 21 to the function key k (step S112). The allocation information of allocating the app 21 to each function key k is, for example, correspondence information indicative of correspondence between the key ID and the app ID. The launcher unit 222 stores the allocation information into the FK setup memory unit 234. Said differently, the correspondence information is changed.

As described, a prioritized app setup, a home button setup, and a setup of the function key k can be arbitrarily changed by the target app 21. The target app 21 can execute the steps on and after step S104 at a time of starting up the target app 21 (at the first start-up or every start-up).

Next, an exemplary transition of the operation screen corresponding to the prioritized app setup, the home button setup, and the setup of the function key k.

Figure 6:
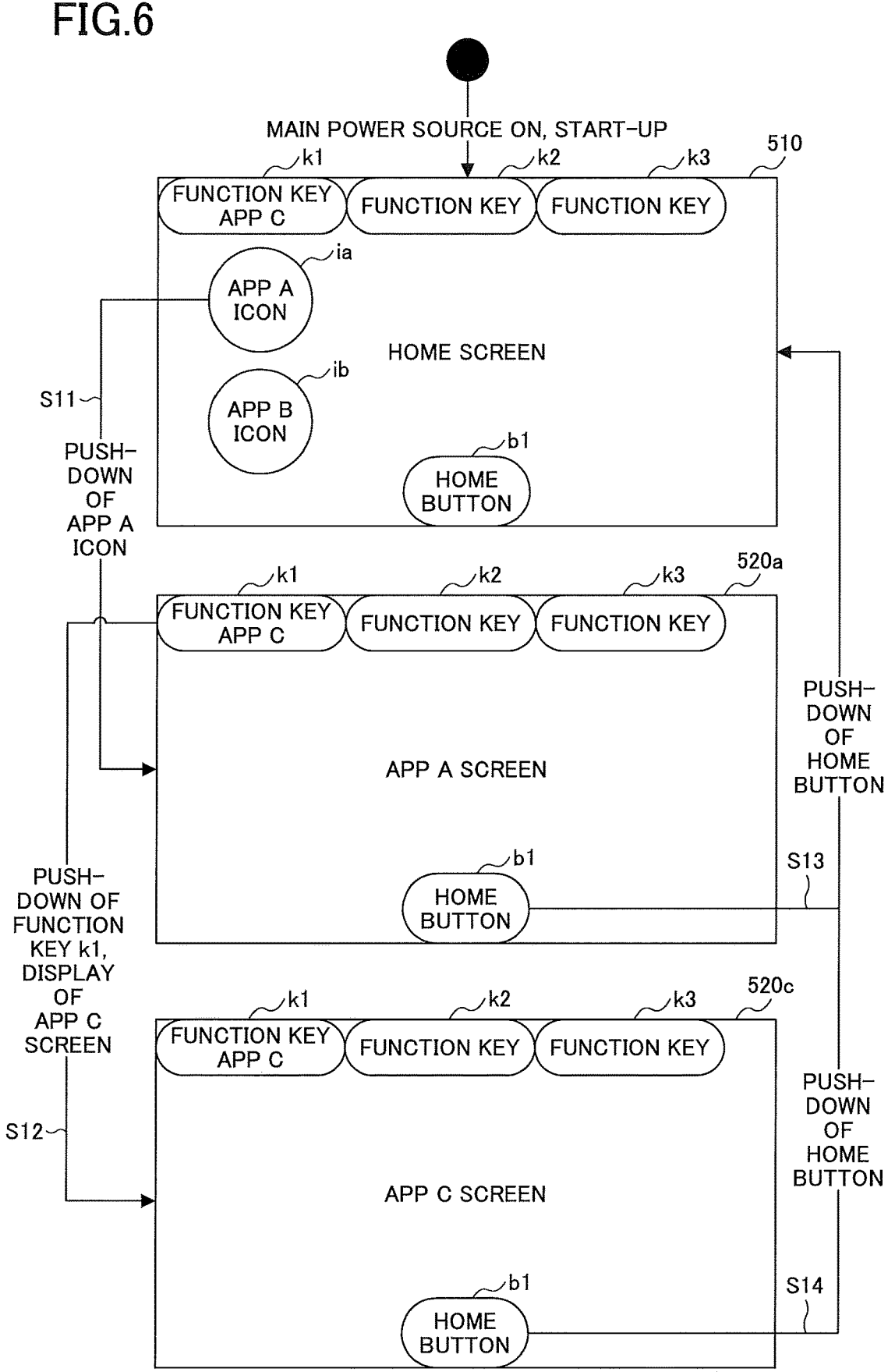
FIG. 6 illustrates a first exemplary transition of an operation screen in the first embodiment.

FIG. 6 illustrates a first exemplary transition on the operation screen in the first embodiment. Referring to FIG. 6, no app 21 is set to the prioritized app and the home button b1, and the app 21c (an app C) is allocated to the function key k1.

In this case, the operation screen firstly displayed after starting up the information processing system 1 is the home screen 510 displayed by the launcher unit 222. An icon is displayed on the home screen 510 based on the information of the app 21 stored in the home screen setup memory unit 232. Referring to FIG. 6, an icon is corresponding to the app 21*a* and an icon ib corresponding to the app 21*b* are displayed. However, an icon of another app 21 such as an app 21*z* may be displayed on the home screen 510. Further, the launcher unit 222 displays the home button b1 and the function keys k1-k3.

When the user pushes down the icon is (the app A icon) while the home screen 510 is displayed, the launcher unit 222 starts up the app 21*a*. As a result, the app 21*a* displays the operation screen 520*a* (the app A screen) on the display device 211 (step S11). The home button b1 and the function keys k1 to k3 are displayed by the launcher unit 222 on the operation screen 520*a*.

When the user pushes down the function key k1 while the operation screen 520*a* is displayed, the launcher unit 222 selects the app 21*c* as a start-up target. As a result, the app 21*c* displays the operation screen 520*c* (the app C screen) related to the app 21*c* on the display device 211 (step S12). The home button b1 and the function keys k1 to k3 are displayed also on the operation screen 520*c*.

When the home button b1 is pushed down while the operation screen 520*a* or the operation screen 520*c* is displayed, the launcher unit 222 displays the home screen 510 on the display device 211 (steps S13 and S14).

Figure 7:
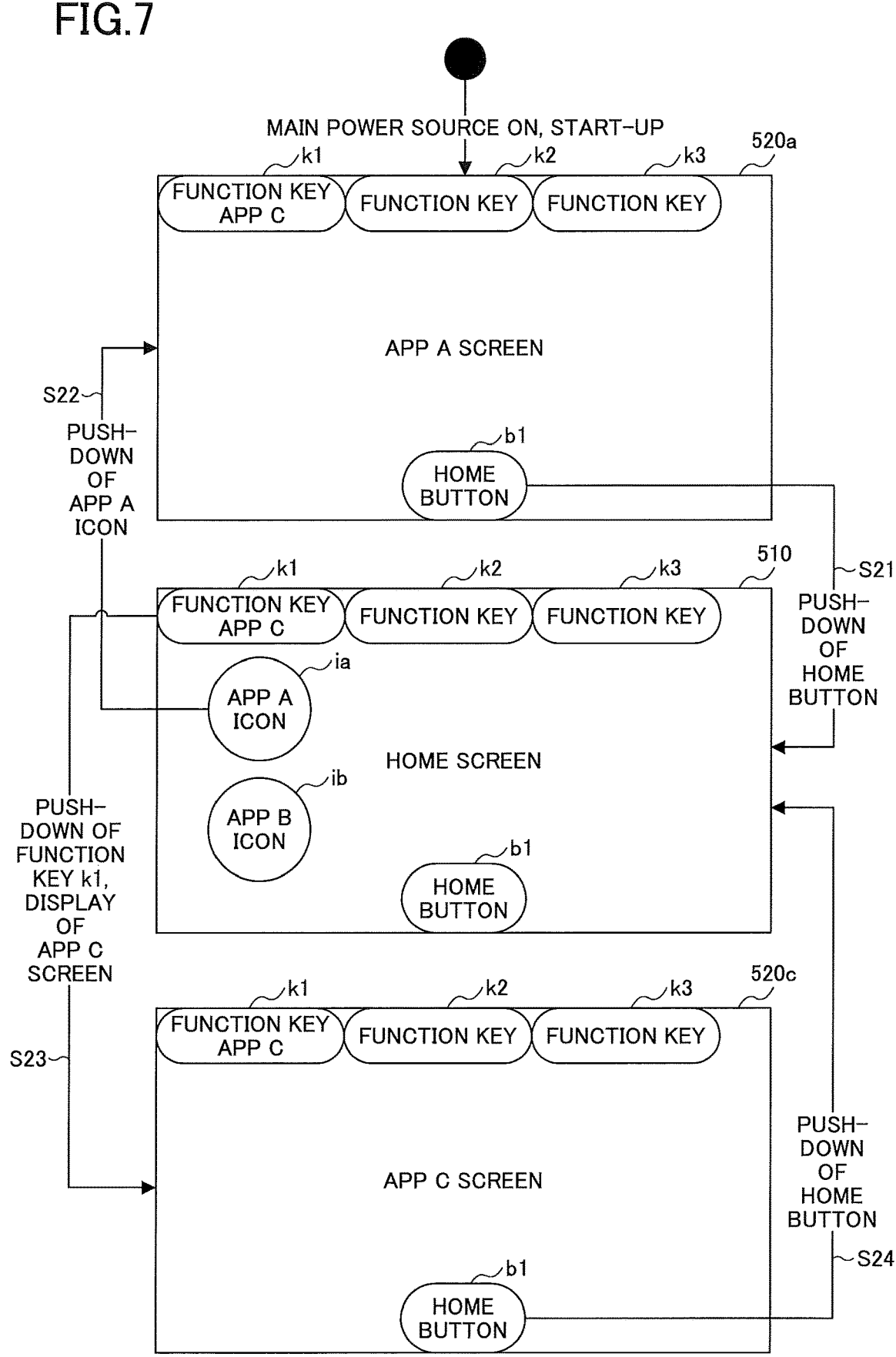
FIG. 7 illustrates a second exemplary transition of the operation screen in the first embodiment.

FIG. 7 illustrates a first exemplary transition on the operation screen in the first embodiment. Referring to FIG. 7, the app 21*a* is set to the prioritized app, no app 21 is allocated to the home button b1, and the app 21*c* is allocated to the function key k1.

In this case, the operation screen firstly displayed after starting up the information processing system 1 is the operation screen 520*a* displayed by the app 21*a*. When the user pushes down the home button b1 while the operation screen 520*a* is displayed, the home screen 510 is displayed by the launcher unit 222 on the display device 211 (step S21).

When the user pushes down the icon is while the home screen 510 is displayed, the launcher unit 222 selects the app 21*a* as the start-up target. As a result, the app 21*a* displays the operation screen 520*a* (the app A screen) on the display device 211 (step S22). When the user pushes down the function key k1 while the home screen 510 is displayed, the launcher unit 222 selects the app 21*c* as the start-up target. As a result, the app 21*c* displays the operation screen 520*c* on the display device 211 (step S23).

When the user pushes down the home button b1 while the operation screen 520*c* is displayed, the home screen 510 is displayed by the launcher unit 222 on the display device 211 (step S24).

Figure 8:
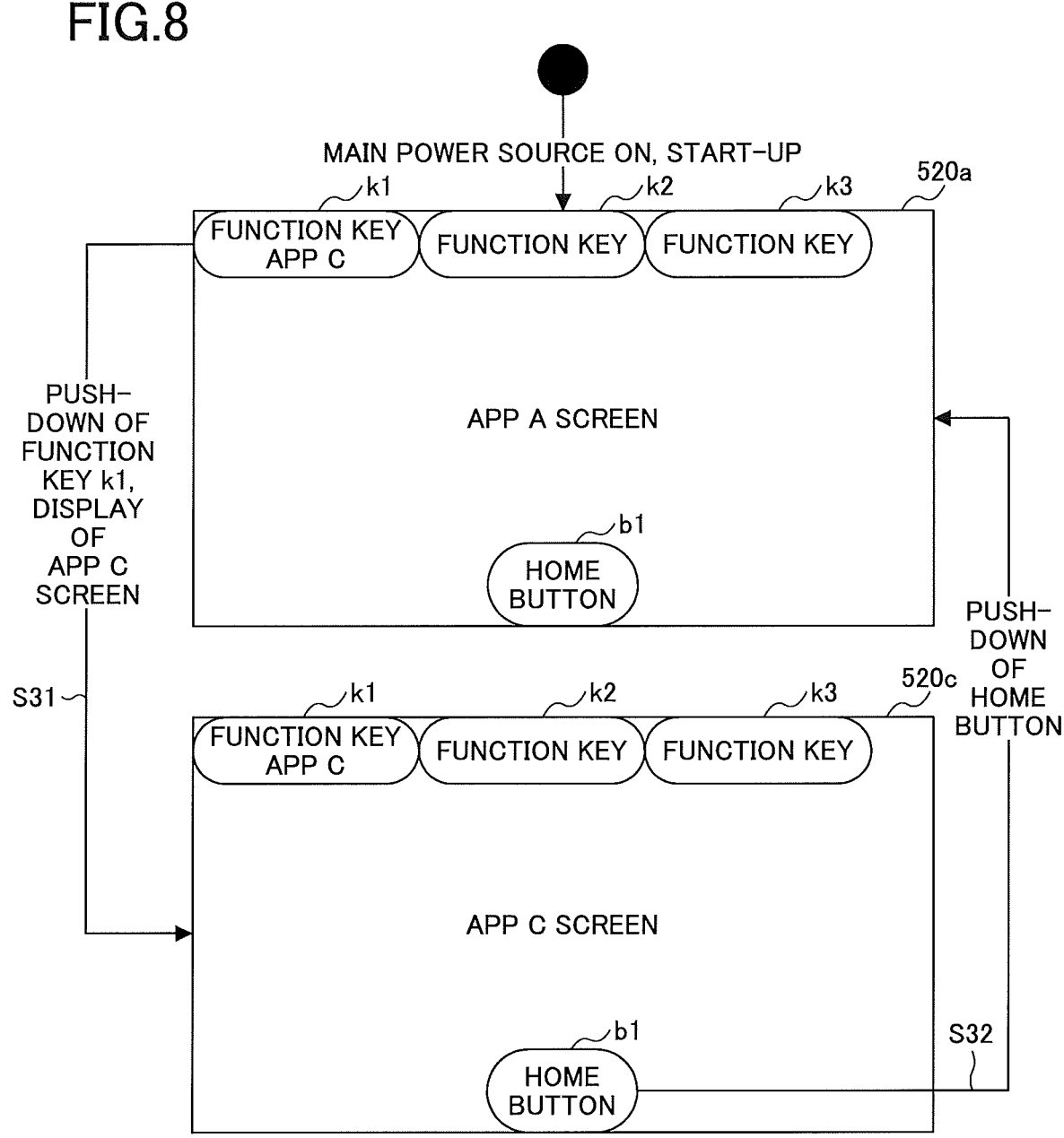
FIG. 8 illustrates a third exemplary transition of the operation screen in the first embodiment.

FIG. 8 illustrates a third exemplary transition on the operation screen in the first embodiment. Referring to FIG. 8, the app 21*a* is set to the prioritized app, the app 21*a* is allocated to the home button b1, and the app 21*c* is allocated to the function key k1.

In this case, the operation screen firstly displayed after starting up the information processing system 1 is the operation screen 520*a* displayed by the app 21*a*. When the user pushes down the function key k1 while the operation screen 520*a* is displayed, the launcher unit 222 selects the app 21*c* as the start-up target. As a result, the app 21*c* displays the operation screen 520*c* on the display device 211 (step S31).

When the user pushes down the home button b1 while the operation screen 520*c* is displayed, the launcher unit 222 selects the app 21*a* as the start-up target. As a result, the app 21*a* displays the operation screen 520*a* (the app A screen) on the display device 211 (step S32).

Figure 9:
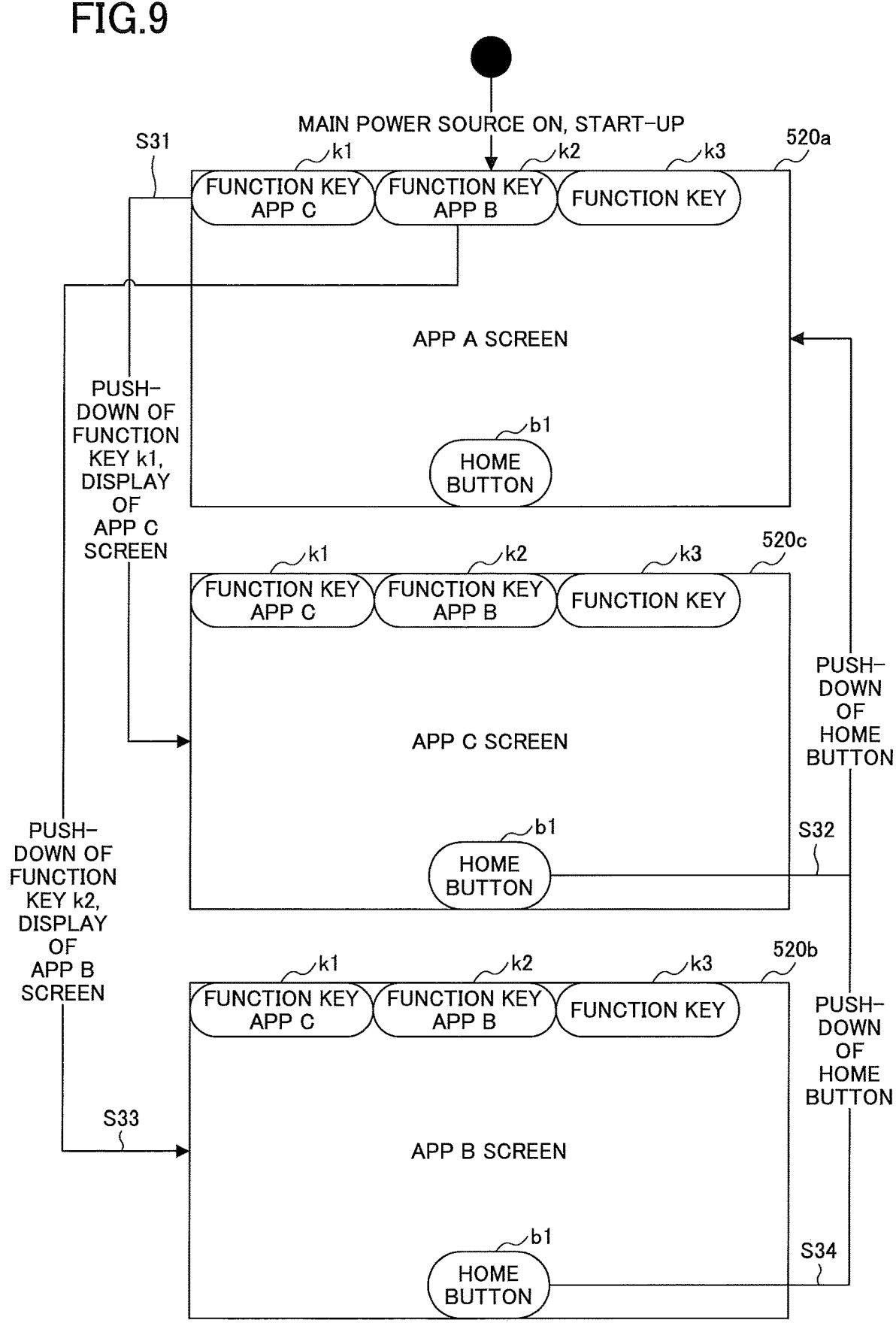
FIG. 9 illustrates a fourth exemplary transition of the operation screen in the first embodiment.

FIG. 9 illustrates a fourth exemplary transition on the operation screen in the first embodiment. Referring to FIG. 9, the same reference symbols as those in FIG. 8 are given to the corresponding steps, and explanation of these steps is omitted. In the example illustrated in FIG. 9, in addition to FIG. 8, the app 21*b* (the app B) is allocated to the function key k2.

When the user pushes down the function key k2 while the operation screen 520*a* is displayed, the launcher unit 222 selects the app 21*b* as the start-up target. As a result, the app 21*b* displays the operation screen 520*b* (the app B screen) related to the app 21*b* on the display device 211 (step S33).

When the user pushes down the home button b1 while the operation screen 520*b* is displayed, the launcher unit 222 selects the app 21*a* as the start-up target. As a result, the app 21*a* displays the operation screen 520*a* (the app A screen) on the display device 211 (step S34).

Figure 10:
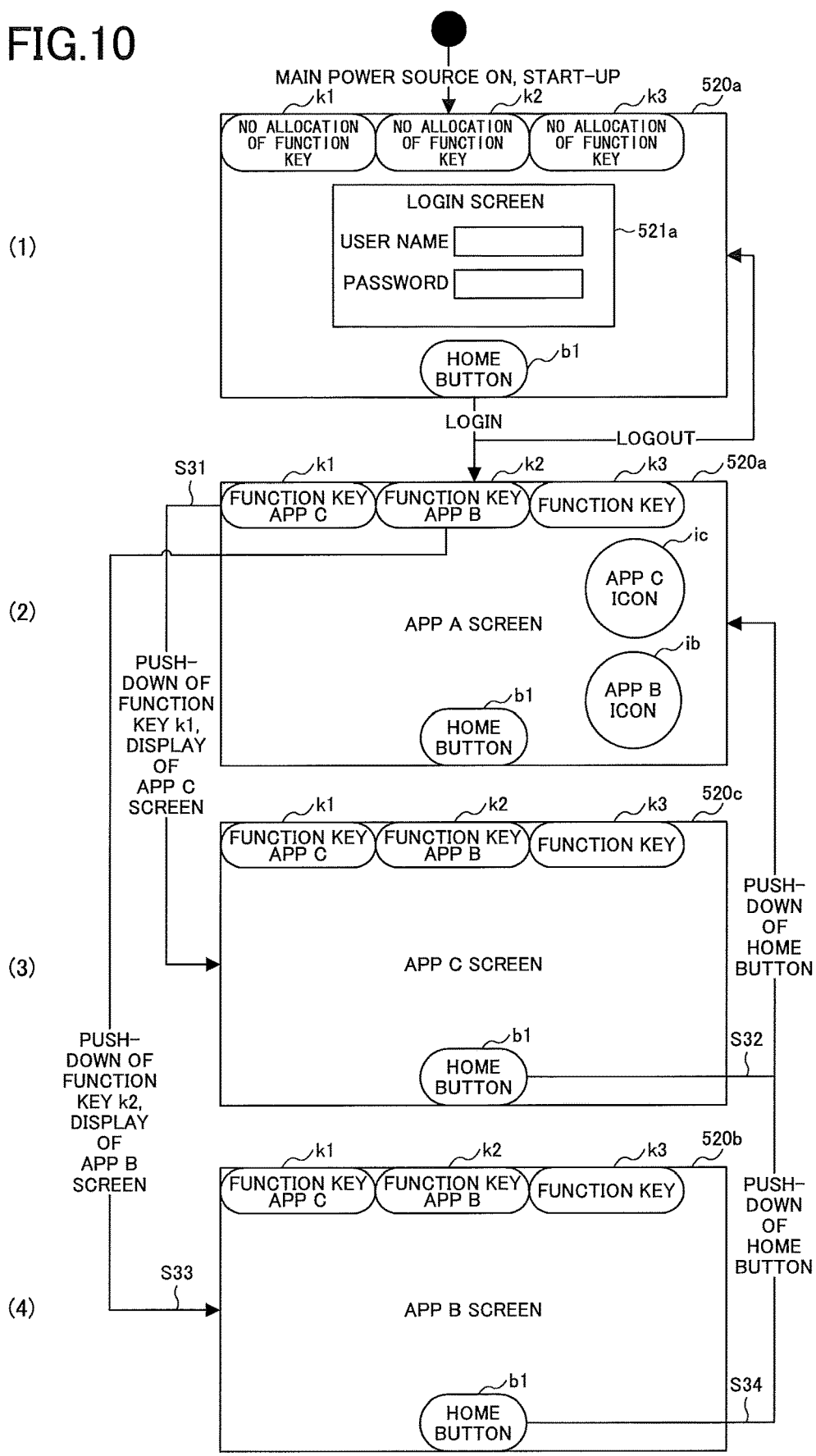
FIG. 10 illustrates a fifth exemplary transition of the operation screen in the first embodiment.

FIG. 10 illustrates a fifth exemplary transition on the operation screen in the first embodiment. The step number in FIG. 9 is attached to a step in FIG. 10 the same as the step in FIG. 9. In the example of FIG. 10, setups of the prioritized app, the home button b1, and the function key k are the same as the setups in FIG. 9. Here, the app 21*a* requires an authentication at a time of starting up the app 21*a*. An icon for receiving a use instruction to use another app 21 can be laid out on the operation screen 520*a* of the app 21*a* in a manner similar to the home screen 510. The exemplary transition of the operation screen in FIG. 10 is described by referring to a sequence diagram illustrated in FIG. 11.

Figure 11:
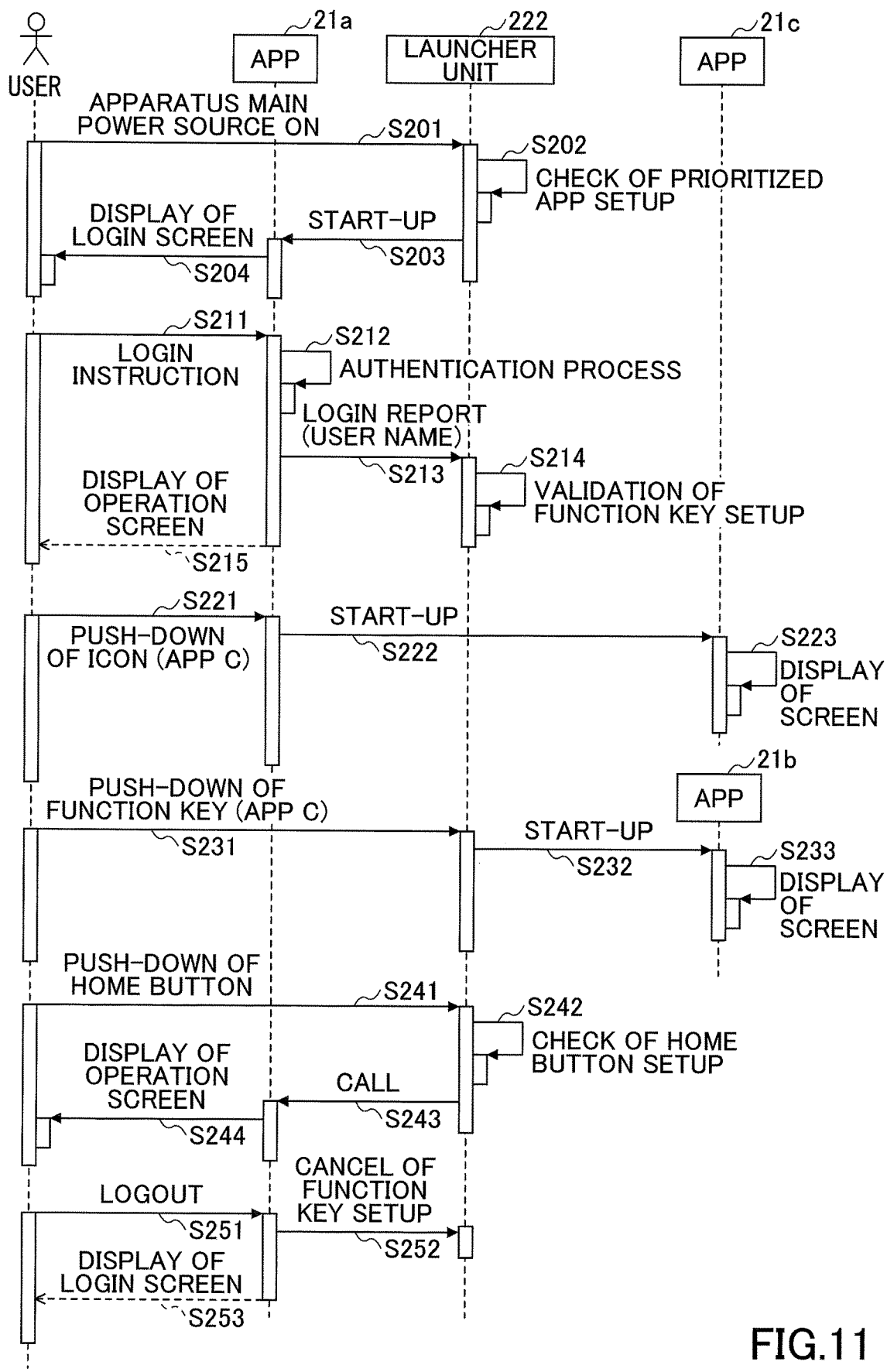
FIG. 11 is a sequence diagram illustrating an exemplary procedure performed at a time of causing the operation screen to transit in the first embodiment.

FIG. 11 is the sequence diagram illustrating an exemplary procedure performed at the time of causing the operation screen to transit in the first embodiment.

The power is thrown in to start up the information processing system 1 (step S201). Then, the launcher unit 222 refers to the prioritized app setup memory unit 231 whether any app 21 is set as the prioritized app (step S202). Here, the app ID of app 21*a* is stored in the prioritized app setup memory unit 231. The launcher unit 222 requests the app 21*a* to start up instead of displaying the home screen (step S203). The launcher unit 222 displays the home button b1 and the function keys k1 to k3 on the display device 211 immediately before step S203. However, the allocation of the app 21 to the home button b1 and the function keys k1 to k3 is not conducted at this time point.

The app 21*a* displays the login screen on the display device 211 in response to the start-up of the app 21*a* (step S204). Referring to FIG. 10, (1) illustrates a display state at the time of step S204. In (1) of FIG. 10, the login screen 521*a* is displayed in step S204. The login screen 521*a* is provided not to limit the use of the information processing system 1 but to limit the use of the app 21*a*. For example, if the app 21*a* was not set to the prioritized app and the use of the app 21*a* is instructed in the home screen 510, the app 21*a* displays the login screen 521*a*. However, here the app 21*a* is set to the prioritized app, and therefore the operation screen 510*a* is firstly displayed after starting up the information processing system 1. Therefore, the use of the information processing system 1 is substantially limited by the login screen 521*a* for limiting the use of the app 21*a*.

When the user name and the password are input into the login screen 521*a* (step S211), the app 21*a* refers to the user information previously stored in the auxiliary memory device 203 or a memory device communicable through the network and performs an authentication for the user name and the password (step S212). Instead of the inputs of the user name and the password, an IC card or the like may be brought closer to the information processing terminal 20. Further, biological information such as a finger print may be input.

In a case where the authentication fails, process on and after the authentication are stopped. In a case where the authentication is successful, the app 21a reports the login of the user to the launcher unit 222 (step S213). In response to the report, the launcher unit 222 validates the allocation information that is stored in the FK setup memory unit 234 and indicates the allocation of each app 21 to each function key k (step S214). Specifically, the launcher unit 222 loads the allocation information stored in the FK setup memory unit 234 into the memory 202. Therefore, the memory 202 stores information associating the key ID of the function key k1 with the app ID of the app 21c and information associating the key ID of the function key k2 with the app ID of the app 21b. Subsequently, the app 21a displays the operation screen 520a (the app A screen) on the display device 211 (step S215). Referring to FIG. 10, (2) illustrates a display state at this time point. Referring to FIG. 10, (2), the operation screen 520a displays the icon ic of the app 21c and the icon ib of the app 21b. These icons are displayed not based on information stored in the home screen setup memory unit 232 but based on setup information peculiar to the app 21a. This is because the information stored in the home screen setup memory unit 232 is setup information for the home screen 510. Therefore, all icons displayed in the home screen 520 are not always displayed on the operation screen 520a. For example, an icon of the app 21 permitted to be used in association with the app 21a is displayed on the operation screen 520a.

The icon ic is selected on the operation screen 520a (step S221). The app 21a starts up the app 21c associated with the icon is in the setup information for the app 21a (step S222). After the app 21c is started up, the app 21c displays the operation screen 520c on the display device 211 (step S223). Referring to FIG. 10, (3) illustrates a display state at this time point.

The user pushes down the function key k2 in a state where the operation screen 520a or 520c is displayed (step S231). Then, the launcher unit 222 starts up the app 21b whose app ID is associated with the key ID of the function key k2 in the memory 202 (step S231). After the app 21b is started up, the app 21b displays the operation screen 520b on the display device 211 (step S233). Referring to FIG. 10, (4) illustrates a display state at this time point.

The user pushes down the home button b1 in a state where the operation screen 520a, 520b, or 520c is displayed (step S241). Then, the launcher unit 222 refers to the home button setup memory unit 233, and checks a setup content for the home button b1 (step S242). Here, the app ID of the app 21a is stored in the home button setup memory unit 223. Therefore, the launcher unit 222 calls the app 21a (step S243). Although the launcher unit 222 requests the app 21a to be start up, the app 21a is already started up. Therefore, the app 21a that has already started-up is called by the operating system (OS). Subsequently, the app 21a displays the operation screen 520a (the app A screen) on the display device 211 (step S244). Referring to FIG. 10, (2) illustrates a display state at this time point.

Thereafter, the user instructs a logout (step S251). Then, the app 21a requests the launcher unit 222 to cancel the setup of the function key k (step S252). The launcher unit 222 cancels the association between each function key k and each app 21 in response to the request. This cancel of the association means not that the memory content of the FK setup memory unit 234 is deleted but that association information in the memory 22 is deleted.

Subsequently, the app 21a displays the login screen 521a (the app A screen) on the display device 211 (step S253).

As clearly known from the above first embodiment, by executing the steps on and after step S104 at the time of installing or starting up the certain app 21, it is possible to limit the app 21 usable in association with the app 21. For example, the app 21a is allocated to the home button b1 and the apps 21b and 21c are allocated to any function key k at the time of installing or starting up the app 21a. Then, the app 21a usable by the user in association with the app 21a to the apps 21b and 21c after displaying the operation screen 520a of the app 21a (see FIGS. 9-10). Said differently, once the operation screen 520a is displayed, the user cannot display the home screen 510.

Further, when the app 21a is set to the prioritized app, the app 21 usable in association with the app 21a on and after the cancel of the usage limitation of the information processing system 1 can be limited to the apps 21b and 21c.

Next, a second embodiment is described. Differences of the second embodiment from the first embodiment are described below. Features of the second embodiment, which are not specifically described, are substantially the same as those of the first embodiment.

Within the second embodiment, described is an example where the allocation of the app 21 to each function key k can be distinguished for each user.

Within the second embodiment, the allocation information of the app 21 to each function key k, which is designated in step S112 illustrated in FIG. 5 is distinguished for each user. For example, the allocation information is associated with each user name and is stored in the FK setup memory unit 234.

In step S214 illustrated in FIG. 11, the launcher unit 222 validates the allocation information that is associated with the user name of the login user and is stored in the FK setup memory unit 234.

As described above, within the second embodiment, the app 21 usable by each user can be limited. For example, the allocation of the app 21b to the function key k2 can be invalidated for a certain user.

A third embodiment is described next. Within the third embodiment, a point different from the above embodiments is described. Features of the third embodiment, which are not specifically described, are substantially the same as those of the first and second embodiments.

Within the third embodiment, not only the app ID but also a start-up argument to the app 21 can be set up as the allocation information to the function key k. The start-up argument is option information (setup information) to the app 21 designated at a time of starting up the app 21.

For example, within the third embodiment, the app 21c is allocated to both of the function key k1 and the function key k2. Further, different start-up arguments are respectively set to these function keys k. Thus, working of the app 21c can be changed between a case where the app 21c is started up in response to the operation of the function key k1 and a case where the app 21c is started up in response to the operation of the function key k2.

Specifically, referring to FIGS. 9-10, the allocation information including the app ID of the app 21c and the start-up argument a is associated with the function key k1, and the allocation information including the app ID of the app 21c and the start-up argument b is associated with the function key k2.

In this case, when the function key k1 is pushed down, the launcher unit 222 starts up the app 21c using the start-up argument a. As a result, the app 21c displays the operation screen 520c corresponding to the start-up argument a (step S31).

On the other hand, when the function key k2 is pushed down, the launcher unit 222 starts up the app 21c using the start-up argument b. As a result, the app 21c displays the operation screen 520c corresponding to the start-up argument b (step S31).

The operation screen 520c corresponding to the start-up argument a or b may have operable setup items fewer or more than operable setup items of the operation screen 520c in a case where the start-up argument is not designated.

Within the above embodiments, the information processing terminal 20 is an example of an information processing apparatus. The launcher unit 222 is an example of a first control unit, a second control unit, and a memory processing unit. The home button b1 is an example of a first display element. The function key k is an example of a second display element. The home button setup memory unit 233 is an example of a first memory unit. The FK setup memory unit 234 is an example of a second memory unit. The app 21 is an example of a program. The home screen 510 is an example of a first operation screen.

According to the embodiments, a program usable in association with a specific program can be limited.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing apparatus of the present invention has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

It should be noted that a person skilled in the field of information processing technology may employ the present invention using application specific integrated circuits (ASIC) or an apparatus in which circuit modules are connected.

Further, each of the functions (units) may be implemented by one or more circuits.

It should be noted that, in this specification, the circuit may include a processor programmed by software to execute the corresponding functions and hardware which is designed to execute the corresponding functions such as the ASIC and the circuit module.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus."

What is claimed is:

1. An information processing apparatus comprising:
a processor; and
a memory storing program instructions that cause the processor to:
lay out a first display element at a predetermined position on a display area of one or more operation screens,
display a first operation screen in response to receiving an operation of the first display element, the first operation screen being a screen including at least one second display element for receiving an operation to select a program from among one or more programs,
lay out the at least one second display element at a predetermined position on the display area of the one or more operation screens, including the first operation screen, each second display element being associated with a target program, based on allocation information associated with a user name, and
display a second operation screen related to a first target program associated with a selected second display element from among the at least one second display element that has been operated, wherein
the processor displays an operation screen related to a prioritized program instead of the first operation screen upon starting up the information processing apparatus in a case where the prioritized program is installed in the information processing apparatus, the prioritized program being a program that is firstly executed upon starting up the information processing apparatus, and
the operation of the first display element on the second operation screen related to the first target program causes the first target program to display the operation screen related to the prioritized program in a case where the first target program was launched by the operation of the associated second display element displayed on the operation screen related to the prioritized program, and
the operation of the first display element on the operation screen related to the prioritized program causes the prioritized program to display the first operation screen.

2. The information processing apparatus according to claim 1, wherein the program instructions further cause the processor to
display the first operation screen upon cancellation of a usage limitation to the information processing apparatus in a case where the prioritized program has not been installed on the information processing apparatus, and
not display the first operation screen upon cancellation of the usage limitation to the information processing apparatus in a case where the prioritized program has been installed on the information processing apparatus.

3. The information processing apparatus according to claim 2, wherein the program instructions further cause the processor to
display the operation screen related to the prioritized program as an operation screen, and
firstly display the operation screen related to the prioritized program after the usage limitation to the information processing apparatus is canceled in a case where the prioritized program has been installed on the information processing apparatus.

4. The information processing apparatus according to claim 1, wherein the program instructions further cause the processor to
store information related to the prioritized program in the memory in response to the install of the prioritized program, and
display the operation screen related to the program corresponding to the information related to the prioritized program stored in the memory in place of the first operation screen in response to an operation of the first display element.

5. The information processing apparatus according to claim 4, wherein the program instructions further cause the processor to
display the operation screen of the program corresponding to the second display element that is operated based on correspondence information, the correspondence information being stored in the memory and indicating a correspondence between the second display element and the program, as the transition destination, and
change the correspondence information in response to the install of the prioritized program.

6. A method for processing information performed by an information processing apparatus, the method comprising:
laying out a first display element at a predetermined position on a display area of one or more operation screens,
displaying a first operation screen in response to receiving an operation of the first display element, the first operation screen being a screen including at least one second display element for receiving an operation to select a program from among one or more programs,
laying out the at least one second display element at a predetermined position on the display area of the one or more operation screens, including the first operation screen, each second display element being associated with a target program, and
displaying a second operation screen related to a first target program associated with a selected second display element from among the at least one second display element that has been operated, wherein
an operation screen related to a prioritized program is displayed, instead of the first operation screen, upon starting up the information processing apparatus in a case where the prioritized program is installed in the information processing apparatus, the prioritized program being a program that is firstly executed upon starting up an information processing apparatus included in the information processing system, and
the operation of the first display element on the second operation screen related to the first target program causes the first target program to display the operation screen related to the prioritized program in a case where the first target program was launched the operation of the associated second display element displayed on the operation screen related to the prioritized program, and
the operation of the first display element on the operation screen related to the prioritized program causes the prioritized program to display the first operation screen.

7. The method for processing information according to claim 6, further comprising:
displaying the first operation screen upon cancellation of a usage limitation to the information processing apparatus in a case where the prioritized program has not been installed on the information processing apparatus, and
not displaying the first operation screen upon cancellation of the usage limitation to the information processing apparatus in a case where the prioritized program has been installed on the information processing apparatus.

8. The method for processing information according to claim 7, further comprising:
displaying the operation screen related to the prioritized program as an operation screen, and
firstly displaying the operation screen related to the prioritized program after the usage limitation to the information processing apparatus is canceled in a case where the prioritized program has been installed on the information processing apparatus.

9. The method for processing information according to claim 6, the method further comprising:
storing information related to the prioritized program in a memory in response to the install of the prioritized program, and
displaying the operation screen related to the program corresponding to the information related to the prioritized program stored in the memory in place of the first operation screen in response to an operation of the first display element.

10. The method for processing information according to claim 9, further comprising:
displaying the operation screen of the program corresponding to the second display element that is operated based on correspondence information, the correspondence information being stored in the memory and indicating a correspondence between the second display element and the program, as the transition destination, and
changing the correspondence information in response to the install of the prioritized program.

11. A computer program product comprising a non-transitory computer-readable medium having a program recorded thereon that is executable by an information processing system, the program causing the information processing system to implement processes of:
laying out a first display element at a predetermined position on a display area of one or more operation screens,
displaying a first operation screen in response to receiving an operation of the first display element, the first operation screen being a screen including at least one second display element for receiving an operation to select a program from among one or more programs, laying out at the least one second display element at a predetermined position on the display area of the one or more operation screens, including the first operation screen, each second display element being associated with a target program, and displaying a second operation screen related to a first program associated with a selected second display element from among the at least one second display element that has been operation, wherein an operation screen related to a prioritized program is displayed, instead of the first operation screen, upon starting up the information processing apparatus in a case where the prioritized program is installed in the information processing apparatus, the prioritized program being a program that is firstly executed upon starting up an information processing apparatus included in the information processing system, and the operation of the first display element on the second operation screen related to the first target program causes the first target program to display the operation screen related to the prioritized program in a case where the first target program was launched by the operation of the associated second display element displayed on the operation screen related to the prioritized program, and the operation of the first display element on the operation screen related to the prioritized program causes the prioritized program to display the first operation screen.

12. The computer program product according to claim 11, wherein the program causes the information processing system to further implement processes of:

displaying the first operation screen upon cancellation of a usage limitation to the information processing apparatus in a case where the prioritized program has not been installed on the information processing apparatus, and not displaying the first operation screen upon cancellation of the usage limitation to the information processing apparatus in a case where the prioritized program has been installed on the information processing apparatus.

13. The computer program product according to claim 12, wherein the program causes the information processing system to further implement processes of:

displaying the operation screen related to the prioritized program as an operation screen, and firstly displaying the operation screen related to the prioritized program after the usage limitation to the information processing apparatus is canceled in a case where the prioritized program has been installed on the information processing apparatus.

14. The computer program product according to claim 11, wherein the program causes the information processing system to further implement processes of:

storing information related to the prioritized program in a memory in response to the install of the prioritized program, and displaying the operation screen related to the program corresponding to the information related to the prioritized program stored in the memory in place of the first operation screen in response to an operation of the first display element.

15. The computer program product according to claim 14, wherein the program causes the information processing system to further implement processes of:

displaying the operation screen of the program corresponding to the second display element that is operated based on correspondence information, the correspondence information being stored in the memory and indicating a correspondence between the second display element and the program, as the transition destination, and changing the correspondence information in response to the install of the prioritized program.

* * * * *